METHODS AND APPARATUS FOR RECORDING WELL LOGGING SIGNALS

Filed Dec. 27, 1967 4 Sheets-Sheet 1

Denis R. Tanguy
INVENTOR.

BY Edward M. Roney
ATTORNEY

Fig. 1A
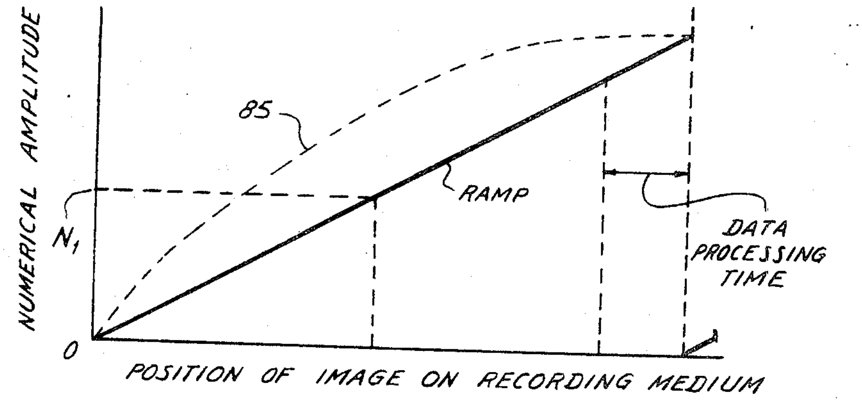
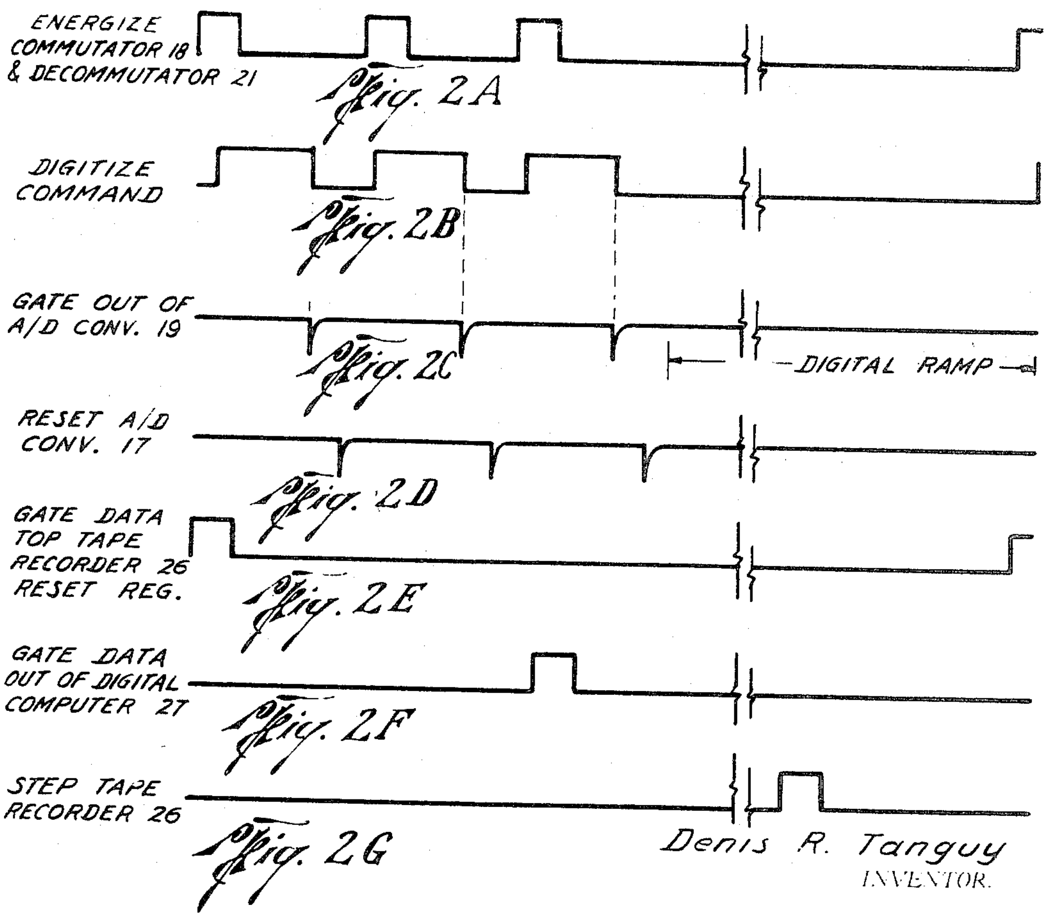
Fig. 2A, Fig. 2B, Fig. 2C, Fig. 2D, Fig. 2E, Fig. 2F
Fig. 2G
Denis R. Tanguy
INVENTOR.
BY Edward M. Roney
ATTORNEY

METHODS AND APPARATUS FOR RECORDING WELL LOGGING SIGNALS

Filed Dec. 27, 1967

4 Sheets-Sheet 3

Denis R. Tanguy
INVENTOR

BY Edward M. Roney

ATTORNEY

Denis R. Tanguy
INVENTOR.

BY Edward M. Roney

ATTORNEY

United States Patent Office 3,488,661
Patented Jan. 6, 1970

3,488,661

METHODS AND APPARATUS FOR RECORDING WELL LOGGING SIGNALS

Denis R. Tanguy, Darien, Conn., assignor to Schlumberger Technology Corporation, New York, N.Y., a corporation of Texas Filed Dec. 27, 1967, Ser. No. 694,010
Int. Cl. G01d 9/28
U.S. Cl. 346—1 20 Claims

ABSTRACT OF THE DISCLOSURE

In accordance with an illustrative embodiment of the invention, a recording medium is moved as a function of borehole depth. A light source adapted to be energized is disposed relative to a sweeping means and the recording medium such that the sweeping means is adapted to sweep the image produced by the light source across the recording medium. A derived well logging signal, in digital form, is stored in a register and a digital ramp function representative of the movement of the sweeping means is generated to be compared with the digital well logging signal. When the two digital signals attain a given relationship, the light source is energized to produce an image or mark on the recording medium and thus provide an analog recording of the digital well logging signal. Additionally, the processing of well logging data is shown to be synchronized with the movement of the sweeping means.

This invention relates to methods and apparatus for recording well logging signals on a recording medium as a function of borehole depth. The invention is especially useful in the analog recording on photographic film or the like of well logging measurements which are in digital form.

In the well logging art, a logging tool containing one or more investigating devices is lowered into a borehole drilled into the earth for measuring various properties of the subsurface earth formations adjacent the borehole. Such measurements are of considerable value in determining the presence or depth of hydrocarbon-bearing zones (oil, gas, etc.) that may exist in the subsurface earth formations.

It has become more and more the practice in the well logging art to convert well logging measurements to a digital coded signal for recordation by a magnetic tape recorder or computation by a digital computer. In many cases, this digital information is transmitted to a remote location for computation with other available well logging data and then subsequently transmitted back to the well site or a nearby location for recordation on magnetic tape.

It would be desirable to have a relatively simple and inexpensive means for recording such digital data in analog form without requiring the usual digital-to-analog converters. In this connection, it would also be desirable to play back and record in analog form this computed digital data in synchronism with the recording of other measurement parameters or characteristics of the adjoining earth formations to provide a so-called "quick look" analog recording of all of the measurements.

However, when utilizing the prior art galvanometer devices for recording this data, it has been necessary to utilize one galvanometer device for each log which it is desired to record. These prior art galvanometer devices may produce inaccuracies due to such things as mechanical vibration, as well as zero stability due to such things as temperature and galvanometer positioning. Additionally, it has been necessary to utilize separate digital-to-analog converters for each data source. It would be desirable in this connection to provide one recording device to provide analog recordings of a plurality of logs even though some of all of the data is in digital form. It would be desirable to also accomplish this without using the usual digital-to-analog converters.

It is an object of the invention therefore to provide new and improved methods and apparatus for recording well logging signals.

In accordance with the present invention, methods and apparatus for recording well logging signals comprise deriving well logging signals representative of a characteristic of earth formations and moving a recording medium as a function of borehole depth. A recording mechanism is moved in a manner to enable a recording mark or image to be swept across the recording medium and a signal adapted to be representative of the position of the recording mark or image on the recording medium is generated. This generated signal is compared with the derived well logging signal to cause a mark to be produced at a certain position on the recording medium in response to the generated and derived signals attaining a given relationship to one another. Desirably, the rate of sweeping this mark across the recording medium is synchronized with the movement of the recording medium. In a preferred form, both the derived and generated signals are in digital form.

For a better understanding of the present invention, together with other and further objects thereof, reference is had to the following description taken in connection with the accompanying drawings, the scope of the invention being pointed out in the appended claims.

Referring to the drawings:

FIGURE 1A shows a plot of amplitude versus recording medium position for explaining the operation of certain features of the present invention;

FIGURES 2A–2G show typical voltage wave forms at various points in the apparatus of FIGURE 1 to provide a better understanding of the operation of the FIGURE 1 apparatus;

Figure 1:
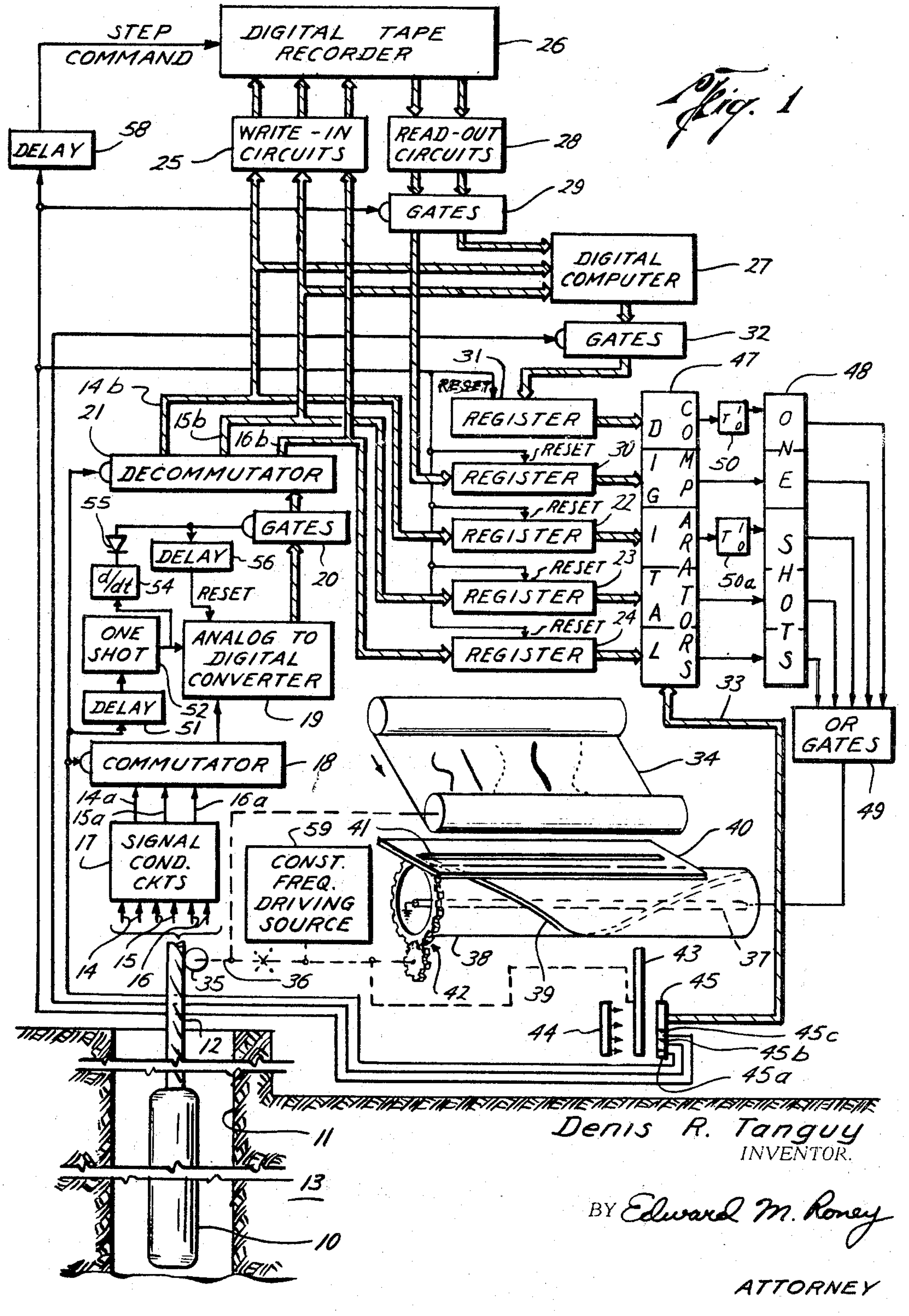
FIGURE 1 shows a plurality of means for deriving well logging data along with a schematic representation of an embodiment of apparatus for recording the derived well logging data in analog form.

Referring now to FIGURE 1, there is shown a downhole investigating apparatus 10 lowered into a borehole 11 on the end of a cable 12 for investigating earth formations 13. The investigating apparatus 10 can comprise any type of exploring instrument that sends electrical signals to the surface of the earth, such as for example, those tools utilized in the logging services commonly known as electrical logging, sonic logging, nuclear logging, etc.

A plurality of conductor pairs 14, 15 and 16 supply the derived well logging signals to signal processing circuits 17 which may take the form of customary signal processing circuits associated with well logging. For example, the signal processing circuits 17 may provide suitable amplification of the signals, impedance matching, and referencing them to a suitable ground reference potential. If the derived signals are in the form of pulses, as is common in nuclear logging, these signal processing circuits may take the form of the customary pulse rate-to-amplitude converters.

The output conductors from signal processing circuits 17, designated 14*a*, 15*a*, and 16*a* to correspond with the conductor pairs 14, 15 and 16, are applied to the input of a commutating device 18. The commutator 18 is responsive to control signals to pass each one of the derived well logging signals on conductors 14*a*, 15*a* or 16*a* in sequence to an analog-to-digital converter 19. After conversion to a digital coded signal, the output signals from the analog-to-digital converter 19 is supplied via a plurality of gate circuits 20 to a decommutator 21 when the gates 20 are energized. The decommutator 21 is responsive to the same control signals that energize commutator 18 to supply the digital coded signals via one of a plurality of conductor bundles 14*b*, 15*b* or 16*b* to one of a plurality of shift registers 22, 23 or 24. The designations 14*b*, 15*b* and 16*b* for the conductor bundles supplying the digital signals to the registers 22–24 correspond to the conductor pair designations 14, 15 and 16. If desired, separate analog-to-digital converters could be used for each channel, thus eliminating the need for commutation and decommutation.

Thus, the well logging signals on conductor pair 14 will be placed in digital form in register 22 during one period of time; the well logging signals on conductor pair 15 will be supplied in digital form to the register 23 during a second period of time; and the well logging signals on conductor pair 16 will be supplied in digital form to the register 24 via the conductor bundle 16*b* during a third period of time.

The digitized well logging signals on conductor bundles 14*b*, 15*b* and 16*b* may also be supplied via write-in circuits 25 to a digital tape recorder 26 and to a suitable digital computer 27 for computation in a desired manner. The digital coded data recorded on two tracks of digital tape recorder 26 is read-out by read-out circuits 28 and gate circuits 29, when energized, to another shift register 30 and to the digital computer 27. The computed output data from digital computer 27 is supplied to another register 31 via gate circuits 32, when energized.

The discussion up to this point has been concerned with how the various data words are supplied to the registers 22–24, 30 and 31. The description of the timing circuitry for energizing the various gate circuits to accomplish this will be discussed later.

The apparatus of the present invention further includes means for converting each of these digital data words in registers 22–24, 30 and 31 to an analog representation thereof on a recording medium 34, such as photographic film. Before proceeding with the discussion of how this is accomplished however, it would first be desirable to discuss how an image is created on the recording medium 34.

To move the recording medium 34 as a function of borehole depth, a rotating wheel 35 is disposed relative to the cable 12 so as to rotate in accordance with the movement of cable 12, and thus as a function of borehole depth. A shaft 36 is coupled from the wheel 35 to the recording medium 34 to move the recording medium 34 as a function of borehole depth. The apparatus of the present invention further includes a recording mechanism for sweeping a recording mark or image across the recording medium 34. To this end, a flash tube 37 is positioned in the center of a cylindrical drum 38 having a spiral split 39 formed in its outer circumference. An opaque plate 40 having a slit 41 formed therein is situated between the drum 38 and the recording medium 34 so that when the flash tube 37 is energized, light will pass through the intersection of the slits 39 and 41 to the recording medium 34 to produce an image or mark thereon. The exact point at which this image will be produced on the recording medium 34 is determined by the position of the helical slit 39 relative to the slit 41. The drum 38 is rotated from the shaft 36 by means of a suitable gearing arrangement 42 as a function of the movement of the cable 12 and thus borehole depth. The helical slitted drum 38 is longer than the width of the recording medium 34 to allow time for the data to be inserted in registers 22–24, 30 and 31 before proceeding with producing a mark or image on recording medium 34. Thus, it can be seen that as the drum 38 is rotated, the image or mark which will be produced on the recording medium 34 when the flash tube 37 is energized will, in effect, sweep across the width of the recording medium 34.

To allow for energizing the flash tube 37 at the proper time, the shaft 36 is also connected to a suitable coded disc 43 which rotates as a function of the movement of cable 12. The disc 43 has a plurality of timing slots (not shown) formed at a suitable location, as near the outer periphery thereof. A suitable light source 44 is situated on one side of disc 43 and a plurality of photocells 45, including suitable shaping circuits, are situated on the other side of the disc 43. The disc 43, in addition to these timing slots, includes a plurality of slots (not shown) which are arranged relative to the photocells 45 to provide a digital ramp output on the conductor bundle 33. That is to say, this digital output from photocells and shaping circuits 45 will take the form of a continuously changing digital number which increases in a linear fashion with the rotation of the shaft 36. Since the disc 43 and drum 38 are both driven by shaft 36, it can be seen that by properly orienting the coded disc 43 relative to the spiral slitted drum 38, this digital ramp function can be synchronized with the sweeping of the image or mark (assuming flash tube 37 to be energized) across the recording medium 34.

This digital ramp could utilize any desirable code, such as the binary code, 2 out of 5, excess 3, etc. to correspond with the coding of the digital well logging data by proper selection of the disc 43. Additionally, other types of coded disc could be utilized, such as a magnetic disc or drum device.

This digital ramp function is applied via the conductor bundle 33 to a plurality of individual digital comparators 47 for comparison with the digital words contained in shift registers 22–24, 30 and 31. When the quantity of the digital ramp function is equal to the quantity contained in one of the registers 22–24, 30 or 31, the particular comparator which is responsive to that register generates an output signal to one of a plurality of one-shots, or monostable multivibrators 48. Each one of the digital comparators 47 generate an output signal upon the digital ramp function equaling the quantity contained in each one of the registers 22–24, 30 and 31.

Each one of the digital comparators 47 can take the form of a plurality of AND gates connected to each output stage of its associated registers 22–24, 30 or 31 and the corresponding conductor of conductor bundle 33. When all of the AND gates of a given digital comparator are energized, thus indicating that the two digital quantities are equal, another AND gate would then generate the output signal to the particular one-shot of one-shots 48. The outputs of all of the one-shots 48 are applied to an OR gate 49 which energizes the flash tube 37.

To provide for coding the various logs recorded on recording medium 34, the "on-time" of each of the one-shots could be suitably selected. Additionally, a pair of trigger flip-flops 50 and 50*a* have been shown on the output of two of the digital comparators 47 to provide for additional coding of the recording traces. That is to say, trigger flip-flops 50 and 50*a* will operate to flash the flash tube 37 every other time the particular trigger flip-flop is energized. The resulting coded traces are shown on recording medium 34. (It is to be understood that these traces would ordinarily not show up as represented in FIGURE 1 until after developing.)

Now concerning the timing of the various operations performed by the FIGURE 1 apparatus, refer to FIGURES 1 and 2A–2G in conjunction. The signals for energizing commutator 18 and decommutator 21 are derived from the photocell 45*a* when the disc 43 is in given rotational positions and are shown in FIGURE 2A. These pulses of FIGURE 2A, after a suitable delay by a delay circuit 51, are also utilized to trigger a one-shot 52 to command the analog-to-digital converter 19 to digitize. This delay insures that the commutator 18 will have time to switch before analog-to-digital converter 19 is enabled. The "digitize command" pulses supplied to analog-to-dgital converter 19 are represented in FIGURE 2B. The trailing edge of these pulses from one-shot 52 are utilized to energize the gate circuits 20 so as to gate the digital word from analog-to-digital converter 19 via the decommutator 21 to one of the registers 22–24, the digital tape recorder 26, or the digital computer 27. This trailing edge is obtained from the pulse output of one-shot 52 through the action of a differentiator 54 and reverse biased diode 55 in a customary manner. The resulting gate energization pulses are shown in FIGURE 2C. After a suitable delay provided by a delay circuit 56, the "gate" pulses of FIGURE 2C are utilized to reset the analog-to-digital converter 19. These reset pulses are shown in FIGURE 2D. If desired, a "sample and hold" circuit could be utilized on the input to the analog-to-digital converter 19 and the analog-to-digital converter reset internally.

The signal for resetting the registers 22–24, 30 and 31 and for energizing the gates 29 to read the data words out of digital tape recorder 26 are derived from the photocell 45*c*. This signal is shown in FIGURE 2E. By comparing FIGURES 2E and 2C, it can be seen that the registers 22–24, 30 and 31 are reset well in advance of the introduction of the first data word to these registers.

To gate the data word out of digital computer 27, a pulse shown in FIGURE 2F is derived from the photocell 45*b* to energize gates 32. As represented in FIGURE 2C, at sometime after the data words are gated into shift registers 22–24, 30 and 31, the digital ramp function is generated from the coded disc 43. The digital tape recorder 26 is stepped to its next position by the pulse shown in FIGURE 2G which is derived from the pulse of FIGURE 2E and delayed by a suitable delay circuit 58.

It would be desirable at this point to summarize the operation of the FIGURE 1 apparatus in a sequential manner. Thus, referring to FIGURES 1 and 2A–2G in conjunction, the first thing that happens is that the well logging signals supplied to the surface of the earth on conductors 14, 15 and 16 are supplied to analog-to-digital converter 19 on a time sharing basis through the action of commutator 18. The resulting digitized signals are supplied to the proper register 22, 23 or 24 through the action of decommutator 21. The timing of this operation can be seen in FIGURES 2A–2D.

At the same time that the first well logging signal is being digitized by analog-to-digital converter 19, data words from two tracks of digital tape recorder 26 are being gated to digital computer 27 and shift register 30 by the pulse of FIGURE 2E energizing gates 29. Also occurring simultaneously with the digitizing of the well logging signals is the writing into the digital computer 27 and tape recorder 26 of various digitized data words from analog-to-digital converter 19. The computed data word from digital computer 27 is then placed in shift register 31 by the pulse of FIGURE 2F energizing gates 32.

Thus, at this point in time, all of the registers 22–24, 30 and 31 have data words corresponding to various sources of information contained therein. Then, at a time corresponding to the image (if flash tube 37 were energized) being at the left-hand or starting point of the recording medium 34, a digital ramp function is supplied to all of the digital comparators 47 through the action of light source 48, disc 43 and photocells and shaping circuits 45. When the magnitude of this digital ramp function is equal to the magnitude of the data word stored in any one of the registers 22–24, 30 and 31, the corresponding digital comparator causes the flash tube 37 to momentarily generate a flash of light to produce an image on the recording medium 34. Through the operation of the trigger flip-flops 50 and 50*a* and one-shots 48, each mark placed on the recording medium 34 is coded for easy identification as to its source. At the same time that this digital ramp function is being generated, the digital tape recorder 26 is stepped by the pulse of FIGURE 2G to its next position and the operation begun again.

Referring now to FIGURE 1A, there is shown a plot of numerical amplitude versus the position of the image on the recording medium 34. The solid line plot designated "Ramp," represents the digital ramp function generated from photocells and shaping circuits 45. In accordance with the previously discussed operation of the FIGURE 1 apparatus, when the amplitude of this digital ramp funcion equals the amplitude of the data in one of the registers, an image is produced on the recording medium 34.

Taking an example of this, assume that the amplitude of data in one of the registers is $N_1$, as shown in FIGURE 1A. Now, as the spiral slitted drum 38 rotates, the image or mark is adapted to be swept (i.e., if flash tube 37 were energized, it would sweep. However, since flash tube 37 is energized only at selected times, it is adapted to be swept) from left-to-right across the recording medium 34 and the digital ramp function increases in amplitude in a proportional manner to the sweep across the recording medium. When the amplitude of the digital ramp function equals the number $N_1$, the flash tube 37 is energized to place an image or mark on the recording medium 34 as represented by the projection of $N_1$ off of the "Ramp" line onto the "image position" axis. The spiral slitted drum 38 has a greater longitudinal length (parallel to width of recording medium) than the width of the recording medium 34 to allow time for the various signals to be processed and inserted in the registers 22–24, 30 and 31. This time is represented in FIGURE 1A by the interval between the "edge of the recording medium" and the end of the ramp function.

It can be appreciated that since the rotation of the drum 38 and disc 43, as well as the movement of the recording medium 34, are a function of the movement of the downhole investigating apparatus 10, as driven by the shaft 36, the rate at which the investigating apparatus 10 is moved through the borehole will not affect the density of the logs recorded on recording medium 34. That is to say, each of the sweeps across the recording medium 34 will be an equal interval apart since the recording medium 34, drum 38, and disc 43 are all driven or operated at the same rate. It can also be appreciated that by controlling all of the data processing operations represented in FIGURE 1 through the disc 43, all of these operations, i.e., digitizing, recording, stepping and reading in and out of the digital tape recorder, as well as the computation by digital computer 27, can all be substantially synchronized together in a relatively simple manner to produce more desirable results.

Those timing control signals which are not derived directly from the disc 43 desirably have a sufficient "time" safety factor that the rate at which the downhole investigating apparatus 10 is moved through the borehole, under normal operating conditions, will not create a conflict between the various operations. Thus, for example, the circuit parameters are selected such that the interval between the reset pulses of FIGURE 2D and the digitize command pulses of FIGURE 2B are separated by a sufficient time interval that the worst case situation will not produce a conflict. However, if desired, all of the timing control functions of the FIGURE 1 apparatus could be derived directly from the disc 43.

Additionally, if desired, the drum 38 and disc 43 could be driven from a separate constant frequency driving source. This is represented in FIGURE 1 by the constant frequency driving source 59 connected by a dash-dot line to the shaft which drives the drum 38 and disc 43. The dash-dot X on the shaft 36 represents that for this alternative embodiment, the drum 38 and disc 43 are not driven as a function of cable movement.

In addition to the above advantages, the apparatus of the present invention provides important advantages concerning function forming of the recorded data, e.g., recording the logarithm of the well logging measurements. This could be accomplished by properly selecting the disc 43. Alternatively, the slit 39 in the drum 38 could be suitably arranged to accomplish this function forming. Thus, for example, the amplitude versus image position curve could be as shown by the dotted line curve 85 in FIGURE 1A.

Figure 3:
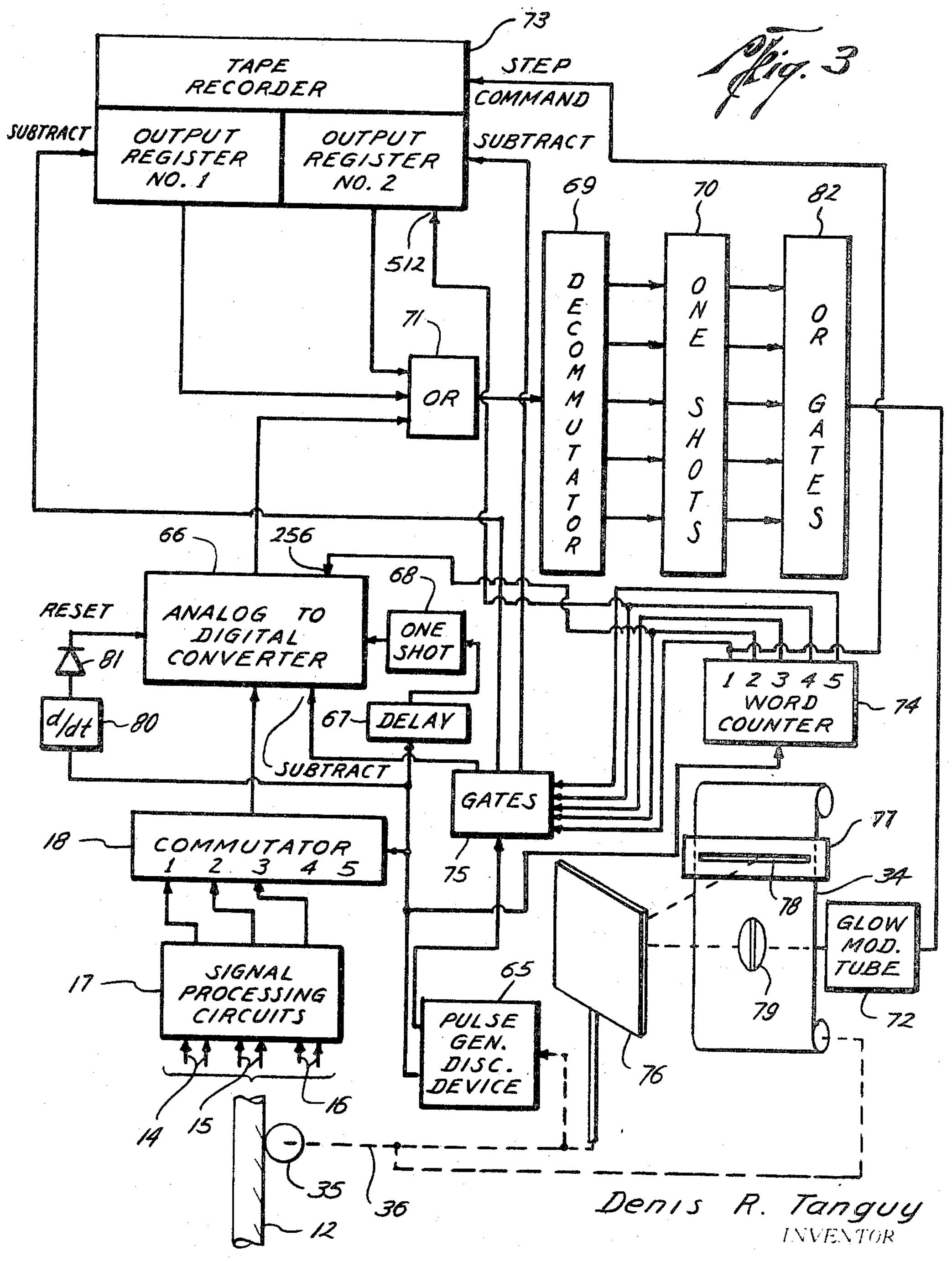
FIGURE 3 shows schematically another embodiment of apparatus for recording well logging data.

Now referring to FIGURE 3, there is shown another embodiment of the present invention wherein digital data words derived from a plurality of data sources are processed and recorded on a time sharing basis. In this FIGURE 3 embodiment, the derived well logging signals are supplied via the conductor pairs 14, 15 and 16 and signal processing circuits 17 to a commutator 64 in the same manner as in FIGURE 1. The commutator 64 is energized from a pulse generating disc device 65, which operates in the same manner as the light source 44, disc 43, photocell and shaping circuits 45 of FIGURE 1. The commutator 64 then supplies the derived well logging signals in sequence to an analog-to-digital converter 66. The digitized data words corresponding to the well logging signals on conductors 14, 15 and 16 are designated data word #1, data word #2, and data word #3 respectively. In the example presented in FIGURE 3, there are two additional data words derived from other sources (to be discussed later), and thus commutator 64 and decommutator 69 will have five switch positions altogether.

The analog-to-digital converter 66 can be of the "time domain" type whereby a free running pulse generator is adapted to supply pulses to a shift register for a time duration proportional to the amplitude of the well logging signals to be digitized. To enable the analog-to-digital converter 66, a "command to digitize" signal is derived from the commutate and decommutate signals generated from pulse generating disc device 65, after a delay by a delay circuit 67. The delayed pulse is then regenerated by a one-shot 68 to command the analog-to-digital converter 66 to digitize. To reset the analog-to-digital converter 66, the leading edge of the commutator pulses derived from pulse generating disc device 65 by way of a differentiator 80 and forward-biased diode 81 are utilized. Alternatively, the analog-to-digital converter 66 could be reset internally.

The pulse generating disc device 65 also generates a plurality of pulses which are channeled during selected times by gate circuits 75 to the output register of analog-to-digital converter 66 to be subtracted from the contents thereof. (Desirably, the binary code should be utilized in conjunction with the FIGURE 3 apparatus to allow this subtraction to take place.) When the contents of the output register of analog-to-digital converter 66 reaches zero, the resulting carry pulse is channeled by a decommutator 69 to one of the one-shots 70. The resulting output pulse from the selected one of the one-shots 70 is utilized to energize a glow modulator tube 72 via an OR gate 82 so as to emit an instantaneous burst of light.

Also included in the FIGURE 3 apparatus is a digital tape recorder 73 having first and second output registers corresponding to first and second recording tracks of the tape recorder. The data words derived from these first and second recording tracks are designated data word #4, and data word #5 respectively. The subtract pulses generated from pulse generating disc device 65 are channeled by the gates 75 during selected times to one of the output registers No. "1" or "2" of tape recorder 73 to subtract from the contents contained in the selected output register. When the contents of the selected register is reduced to zero, the resulting carry pulse is supplied via the OR gate 71 to the decommutator 69 which channels the pulse to the proper one-shot of one-shots 70 to energize glow modulator tube 72 in the same manner as previously discussed.

To keep track of which digital data word is being processed, the FIGURE 3 apparatus also includes a recirculating word counter 74 which is responsive to the commutate pulses generated from pulse generating device 65. The word counter 74 switches sequentially between a plurality of outputs designated 1 through 5 whenever a commutate pulse is received. Which word is being processed at any given time is indicated by an output signal appearing on one of the output leads from word counter 74. The signals on these output leads from word counter 74 are utilized to energize different gates of gate circuits 74 to channel the subtract pulses from disc device 65 to either the output register of analog-to-digital converter 66 or the output registers No. "1" or "2" of tape recorder 73. Additionally, the No. "1" output from word counter 74 is utilized to step the tape recorder 73 to its next position.

Now concerning the apparatus for producing a mark or image on the recording medium 34 of FIGURE 3, there is shown a rotating mirror 76 which is driven by the rotating wheel 35 via shaft 36. The shaft 36 is also coupled to the pulse generating disc device 65 so as to rotate the disc thereof in the same manner as in FIGURE 1. An opaque plate 77 having a longitudinal slit 78 in a parallel relationship to the width of the recording medium 34 is positioned between the rotating mirror 76 and recording medium 34. The glow modulator tube 72 is positioned with respect to the mirror 76 and recording medium 34 to pass light, when tube 72 is energized, through a suitable lens 79 to be reflected off of the rotating mirror 76 and through the longitudinal slit 78 onto the recording medium 34.

Thus, in operation, the rotating mirror 76 is rotated as a function of the movement of cable 12 so that the image of the light from glow modulator tube 72, if energized, is swept across the width of the recording medium 34. At the same time that the rotating mirror 76 is sweeping the image across the recording medium 34, the pulse generating disc device 65 is generating pulses in synchronism with the rotation of mirror 76 to be subtracted from the contents of either the output register of analog-to-digital converter 66 or the output registers No. "1" or "2" of tape recorder 73, depending on which data word is being processed.

In accordance with another feature of the present invention, a multiple track recording can readily be made by inserting a "1" in the proper stage of any one of the shaft registers. This, in effect, will add a given numerial quantity to that already contained in the register. To provide for recording the proper data word in the proper recording track of recording medium 34, the word counter 74 is utilized. Thus, assuming that the second and fourth data words are to be recorded in separate recording tracks (tracks II and III) of recording medium 34 than the first, third, and fifth data words (to be recorded in track I), the pulse from word counter 74 corresponding to the second data word is utilized to energize the flip-flop of the output register of analog-to-digital converter 66 corresponding to the number 256 (assume for present purposes that 256 is the numerical starting point of track No. II). The output from word counter 74 corresponding to the fourth data word is supplied to the flip-flop of output register No. 1 of tape recorder 73 corresponding to the number 512 to place the No. 4 data word in track No. III (assume for present purposes that 512 is the numerical starting point of track III).

Figure 4:
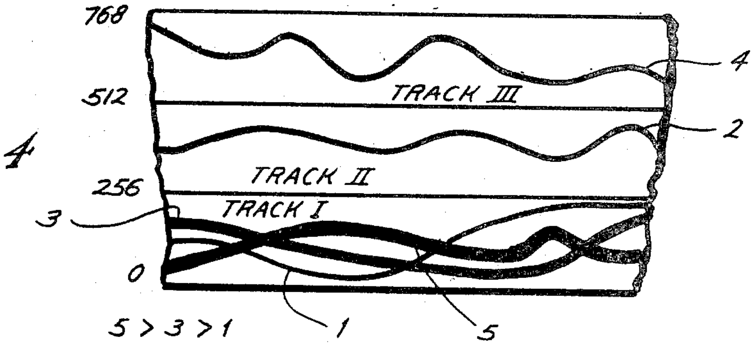
FIGURE 4 shows a typical example of the recorded logs produced by the FIGURE 3 apparatus.

Referring to FIGURE 4, there is shown a typical representation of how the recording medium 34 might look after developing when utilizing this multi-track feature of the FIGURE 3 apparatus. The logs corresponding to the various data words are designated "1" through "5" in FIGURE 4. It can be seen in FIGURE 4 that track No. I corresponds to those numbers between 0 and 256, track No. II corresponds to all numbers between 256 and 512 and track No. III corresponds to all numbers between 512 and 768. Thus, when a "1" is inserted in the flip-flop of the output register of analog-to-digital converter 66 corresponding to the number 256, 256 subtract pulses plus the total data count in the register will have to be subtracted therefrom before a carry pulse will be generated to energize the glow modulator tube 72. The same manner of operation applies to the output register No. 2 of tape recorder 73 to position the log corresponding thereto on track III of recording medium 34.

Figures 5A, 5B, 5C, 5D, 5E, 5F:
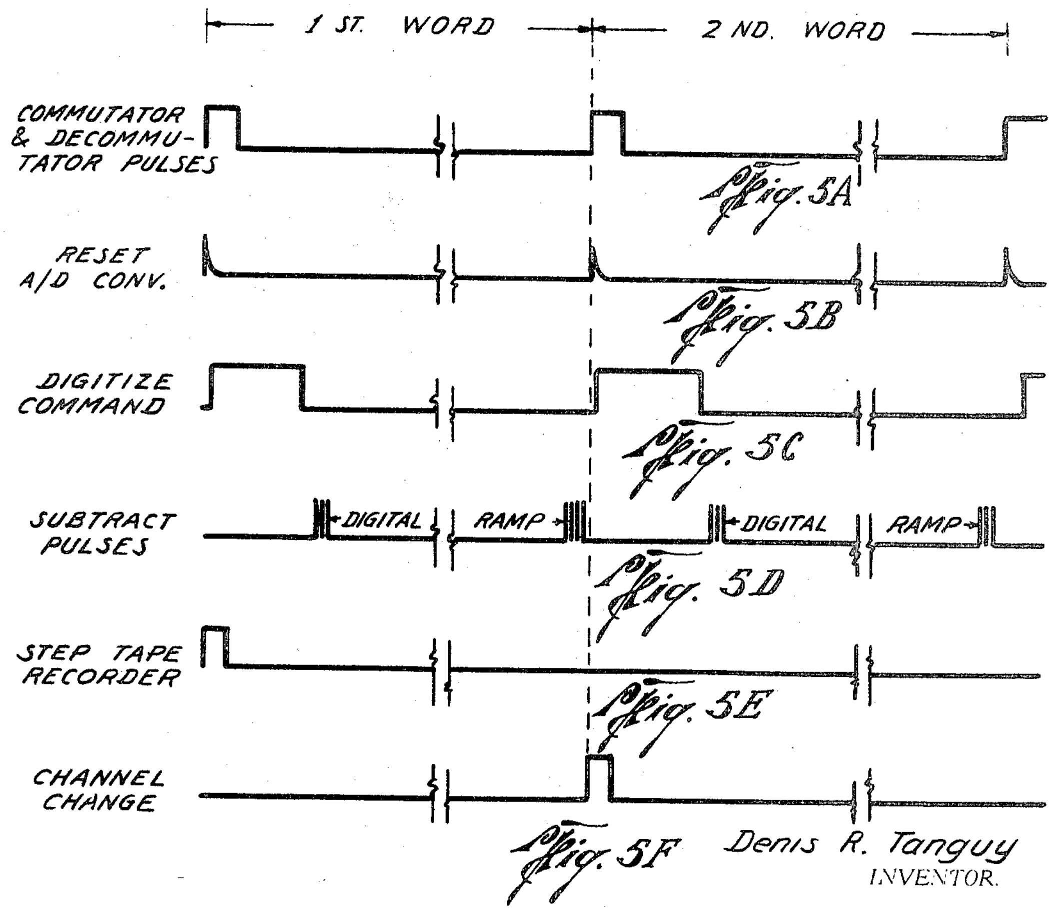
FIGURES 5A–5F show typical voltage wave forms at various points in the FIGURE 3 apparatus to provide a better understanding of the operation thereof.

Now concerning the sequence of operation of the FIGURE 3 apparatus, refer to FIGURES 3 and 5A–5F in conjunction. FIGURES 5A–5F shows the timing control pulses utilized for the recording of the first two digital data words, the recording of the remaining data words being similar in operation. Concerning the first word portion of FIGURES 5A–5F, the commutator and decommutator pulses of FIGURE 5A are generated from pulse generating disc device 65 to place the commutator 64 and decommutator 21 in the proper positions. The leading edge of this first commutator and decommutator pulse of FIGURE 5A is utilized to reset the analog-to-digital converters 66 by way of the differentiator 80 and diode 81. These reset pulses are shown in FIGURE 5B. Also during the digitizing and recording of the first data word, the tape recorder 73 is stepped to the next position by a signal from the word "1" output of word counter 74. This pulse is shown in FIGURE 5E. After a suitable delay of the commutator and decommutator pulse of FIGURE 5A by delay circuit 67, one-shot 68 generates the "digitize command" pulse of FIGURE 5C.

At some later point in time, corresponding to the rotating mirror 76 being in a position to produce an image on the left-hand side of the recording medium 34 (i.e., the "0" point of track I in FIGURE 4), the subtract pulses from FIGURE 5D are generated from pulse generating disc device 65 and channeled by the gates 75 to the output register of analog-to-digital converter 66 so as to subtract the contents contained therein. When the entire contents of this output register have been subtracted out, the resulting carry pulse energizes the proper one-shot of one-shots 70 by way of decommutator 69 to energize the glow modulator tube 72. As in the FIGURE 1 appaartus, the rotation position of the rotating mirror 76 relative to the recording medium 34 when this carry pulse is generated, is proportional to the amplitude of the data word contained in the output register of analog-to-digital converter 66.

Now concerning the second word portion of FIGURES 5A–5F, the stepping of the commutator 64 and decommutator 69 to the word No. 2 position, the reset of analog-to-digital converter 66, and the "digitize command" signal all take place in the same manner as discussed in connection with the first data word. However for the second data word, the commutator and decommutator pulse of FIGURE 5A corresponding to the second data word will cause the word counter 74 to produce an output signal on the word No. 2 output, thus inserting a "1" in the flip-flop corresponding to the number 256 in the output register of analog-to-digital converter 66. The subtract pulses of FIGURE 5D then must subtract 256 bits plus the quantity of the digitized data word placed in the output register of analog-to-digital converter 66 before glow modulator tube 72 is energized. The apparatus then proceeds in a similar manner on the remainder of the data words. At the end of the fifth data word cycle, the first data word is processed again, etc.

It can be seen that the apparatus of the present invention provides a relatively easy and straight forward manner of producing an analog recording of digital information without the necessity of digital-to-analog converters. In addition, the apparatus of the present invention also provides a technique for synchronizing the processing of well logging data with the sweeping of a mark or image across a recording medium.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of recording well logging signals, comprising:

(a) deriving a well logging signal representative of a measured characteristic of earth formations at given depth levels of earth formations traversed by a borehole;
(b) moving a recording medium as a function of borehole depth;
(c) moving a recording mechanism as a function of borehole depth to enable a recording mark to be swept across the recording medium in synchronism with the movement of said recording medium;
(d) generating a signal adapted to be representative of the position of the recording mark on the recording medium in response to the movement of the recording mechanism; and
(e) producing a mark on the recording medium in response to a given relationship between the generated and derived signals to provide an anolog representation of the derived well logging signal on the recording medium.

2. A method of recording well logging signals, comprising:

(a) deriving a plurality of digital signals representative of characteristics of earth formations measured by a plurality of investigating devices at given depth levels of earth formations traversed by a borehole;
(b) moving a recording medium as a function of borehole depth;
(c) moving a recording mechanism to enable a recording mark to be swept across the recording medium;
(d) generating a digital signal adapted to be representative of the position of the image on the recording medium in response to the movement of the recording mechanism;
(e) comparing the derived and generated digital signals and energizing the image producing means to produce an analog representation of the derived digital signal on the recording medium when said derived and generated digital signals attain a given relationship therebetween; and
(f) generating control signals for processing well logging data in synchronism with the movement of the recording mechanism.

3. A method of recording well logging signals, comprising:

(a) deriving a digital signal representative of a measured characteristic of earth formations at given depth levels of earth formations traversed by a borehole;
(b) moving a recording medium as a function of borehole depth;
(c) moving a recording mechanism to enable a recording mark to be swept across the recording medium;
(d) generating a digital ramp signal adapted to be representative of the position of the recording mark on the recording medium as the recording mechanism moves across the recording medium; and
(e) comparing the generated and derived digital signals and producing a mark representative of the derived digital signal on the recording medium in response to the generated and derived digital signals obtaining a given relationship therebetween.

4. The method of claim 3 wherein the derived signal is a coded digital signal having a numerical parameter representative of the measured characteristic and the generated digital signal is a coded digital signal having a numerical parameter representative of the relative position of the recording mechanism at given instants of time; and the step of comparing the signals and producing a mark on the recording medium includes comparing the generated and derived digital coded signals and producing said mark on the recording medium when said generated and derived signals are equal in magnitude.

5. The method of claim 3 wherein the generated digital signal is a series of pulses representative of incremental movements of the recording mechanism; and the step of comparing the generated and derived digital signals to provide a mark on the recording medium includes subtracting the generated pulses from the derived digital signal and producing the mark on the recording medium when the derived digital signal has been reduced to a given numerical amount.

6. The method of claim 3 wherein there are a plurality of derived digital signals representative of characteristics measured by a plurality of investigating devices; and further including the step of increasing the numerical quantity of selected ones of the derived digital signals whereby said selected signals will be recorded on a separate track of the recording medium from other of said derived digital signals.

7. Apparatus for recording well logging signals, comprising:

(a) means for deriving a signal representative of a measured characteristic of earth formations at given depth levels of earth formations traversed by a borehole;

(b) a recording medium adapted to be moved as a function of borehole depth;

(c) image producing means adapted to be energized to produce an image on the recording medium;

(d) sweeping means adapted for sweeping the image across the recording medium in synchronism with the movement of said recording medium;

(e) means coupled to the sweeping means and adapted for generating a signal representative of the position of the image on the recording medium; and (f) converting means responsive to the derived and generated signals for energizing the image producing means to produce an analog representation of the derived signal on the recording medium.

8. Apparatus for recording well logging signals, comprising:

(a) means for deriving a digital signal representative of a measured characteristic of earth formations at given depth levels of earth formations traversed by a borehole;

(b) a recording medium adapted to be moved as a function of borehole depth;

(c) image producing means adapted to be energized to produce an image on the recording medium;

(d) sweeping means adapted for sweeping the image across the recording medium;

(e) means coupled to the sweeping means and adapted for generating a digital ramp signal representative of the position of the image on the recording medium as the image moves across the recording medium; and (f) converting means responsive to the derived and generated digital signals for energizing the image producing means to produce an analog representation of the derived digital signal on the recording medium when the derived and generated digital signals attain a predetermined relationship to one another.

9. The apparatus of claim 8 wherein the means coupled to the sweeping means and adapted for generating a digital signal includes:

(1) a coded disc coupled to the sweeping means for rotating in synchronism with the sweeping means;

(2) means responsive to the rotational position of the coded disc for generating a digital ramp signal representative of the relative position of the sweeping means; and the converting means includes:

(a) means for comparing the derived digital signal with the generated digital ramp signal and energizing the image producing means when the magnitude of the derived and generated digital signals are equal so as to place an analog representation of the derived digital signal on the recording medium.

10. The apparatus of claim 8 wherein the means for generating a digital signal includes means responsive to the sweeping movement of the sweeping means for generating a pulse for each incremental movement of the sweeping means, said pulses being subtracted from the derived digital signal; and wherein the converting means is responsive to the derived digital signal being reduced to a given quantity for energizing the image producing means to produce the analog representation.

11. The apparatus of claim 8 wherein the means for deriving a digital signal representative of a measured characteristic includes means for deriving a plurality of digital signals representative of a plurality of characteristics measured by a plurality of investigating devices; and wherein the means coupled to the sweeping means further includes means for applying the derived digital signals to the converting means on a time sharing basis to produce separate analog representations of all of the measured characteristics.

12. The apparatus of claim 11 wherein the means coupled to the sweeping means further includes means for increasing the quantity of at least one digital signal corresponding to at least one investigating device by a given amount to produce an analog representation of said at least one digital signal on a separate track of the recording medium from at least one other digital signal corresponding to at least one other investigating device.

13. The apparatus of claim 8 wherein the means for deriving a digital signal includes tape recorder means for storing digital representations of well logging measurements; and wherein the means coupled to the sweeping means further includes control means for reading out the digital representations from the tape recorder means in synchronism with the sweeping movement of the sweeping means.

14. The apparatus of claim 8 wherein the means for deriving a digital signal includes:

(1) means for deriving an analog signal representative of said measured characteristic;

(2) analog-to-digital conversion means adapted for converting the derived analog signal to a digital signal representative of the derived analog signal; and wherein the means coupled to the sweeping means further includes control means for enabling the analog-to-digital conversion means to operate in synchronism with the sweeping movement of the sweeping means.

15. The apparatus of claim 8 wherein the sweeping means is driven as a function of borehole depth.

16. Apparatus for recording well logging signals, comprising:

(a) means for deriving a digital signal representative of a measured characteristic of earth formations at given depth levels of earth formations traversed by a borehole including output register means for storing the digital signal;

(b) a recording medium adapted to be moved as a function of borehole depth;

(c) image producing means adapted to be energized to produce an image on the recording medium;

(d) sweeping means adapted for sweeping the image across the recording medium;

(e) means coupled to the sweeping means and adapted for generating a series of pulses representative of the movement of the image across the recording medium, the pulses being subtracted from the contents of the output register; and (f) means responsive to the contents of the output register being reduced to a given quantity for energizing the image producing means to produce an analog representation of the derived digital signal on the recording medium.

17. The apparatus of claim 16 wherein the means for deriving a digital signal includes means for deriving a plurality of digital signals representative of characteristics measured by a plurality of investigating devices, each of said means for deriving digital signals including an output register; and wherein the means coupled to the sweeping means further includes control means for gating the pulses to each one of the output registers in sequence to be subtracted from the contents of said output registers for producing analog representations of the digital signals corresponding to the plurality of investigating devices, the gating of the pulses to the different output registers being synchronized with the sweeping movement of the sweeping means.

18. The apparatus of claim 17 wherein the means coupled to the sweeping means further includes means for energizing at least one stage of at least one output register to increase the quantity of at least one digital signal corresponding to at least one investigating device by a given amount to produce an analog representation of said at least one digital signal on a separate track of the recording medium from at least one other digital signal corresponding to at least one other investigating device.

19. Apparatus for recording well logging signals, comprising:

(a) means for deriving a digital signal representative of a measured characteristic of earth formations at given depth levels of earth formations traversed by a borehole;

(b) a recording medium adapted to be moved as a function of borehole depth;

(c) a light source adapted to be energized to produce an image on the recording medium;

(d) rotatable sweeping means adapted for sweeping the image across the recording medium;

(e) rotating means coupled to the sweeping means for rotating in synchronism therewith and adapted for generating a digital ramp signal representative of the rotatable position of the sweeping means as the image is swept across the recording medium; and (f) means for comparing the derived digital signal with the generated digital signal and energizing the light source to produce an analog representation of the derived digital signal on the recording medium when said derived and generated digital signals obtain a given relationship to one another.

20. The apparatus of claim 19 wherein the rotating means is adapted for generating control signals to control the processing of well logging data in synchronism with the rotation of the rotatable sweeping means.

References Cited

UNITED STATES PATENTS

| | | | |
|---|---|---|---|
| 2,167,460 | 7/1939 | Mathes | 178—7.4 |
| 2,718,449 | 9/1955 | Piety et al. | 346—33 |
| 3,389,403 | 6/1968 | Cottingham et al. | 346—108 |

JOSEPH W. HARTARY, Primary Examiner

U.S. Cl. X.R.

340—15.5; 346—33, 108